Nov. 8, 1949  T. W. HALLERBERG  2,487,238
OPTICAL OIL CONDITION INDICATOR
Filed Dec. 9, 1946  2 Sheets—Sheet 1
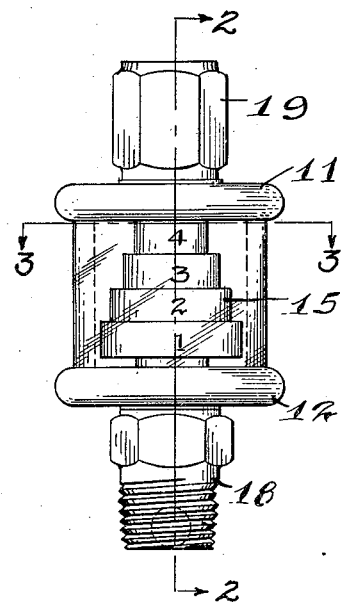
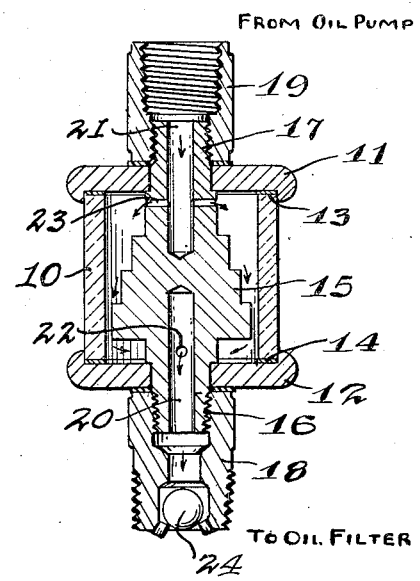
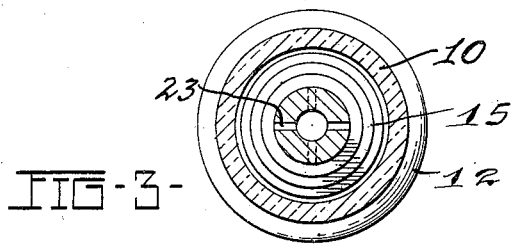
INVENTOR.
THEODORE W. HALLERBERG
BY
ATTYS.

Nov. 8, 1949   T. W. HALLERBERG   2,487,238
OPTICAL OIL CONDITION INDICATOR
Filed Dec. 9, 1946   2 Sheets-Sheet 2
FIG-4-
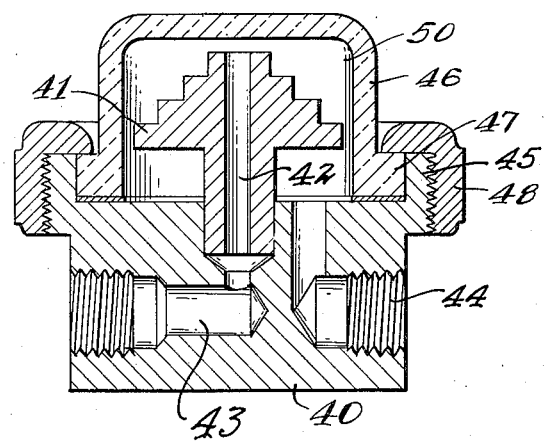
FIG-5-
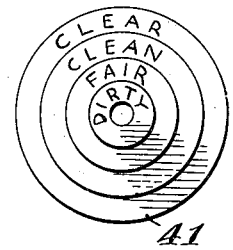
FIG-6-
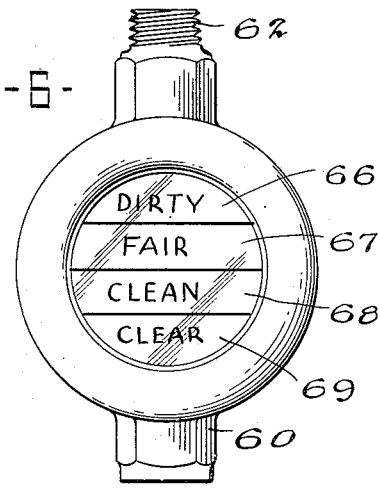
FIG-7-
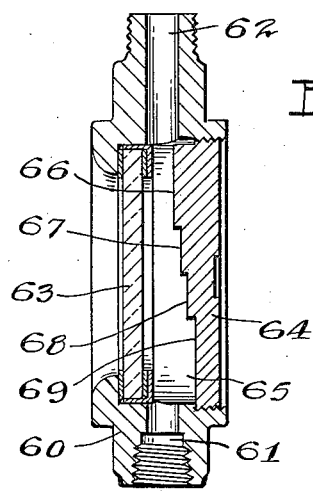
INVENTOR.
THEODORE W. HALLERBERG
BY
Owen & Owen
ATTYS.

Patented Nov. 8, 1949

2,487,238

UNITED STATES PATENT OFFICE 2,487,238

OPTICAL OIL CONDITION INDICATOR

Theodore W. Hallerberg, Chicago, Ill.

Application December 9, 1946, Serial No. 715,027

1 Claim. (Cl. 88—14)

This invention relates to an oil condition indicator that may be mounted in the oil line of an automotive vehicle and give an instantaneous indication to the operator of the condition of the lubricant being used in the vehicle engine.

It is well known that the lubricant in an automotive vehicle engine should be changed or renewed not only when it becomes diluted with unburned fuel but when a mass of sludge and other contaminants accumulates in the lubricant to a degree sufficient to interfere seriously with its lubricating properties. The presence of sludge and contaminants can easily be detected visually. This examination is sometimes made by a service station attendant by observing the color of the oil as a sample is extracted from the crank space by means of the common dip stick.

The present invention has for its primary object to provide a simple and inexpensive device which may be permanently inserted in an oil line and which will enable a ready visual examination of the lubricant to be made.

Another object of the invention is to provide a device by which the condition of the lubricant may be arbitrarily graded as to its condition so that the operator can readily judge whether or not it is in such condition that it should remain in the engine.

Still another object of the invention is to provide an oil condition indicator in which a plurality of reflecting surfaces are utilized with predetermined thicknesses of oil to enable the operator to determine visually the opacity and hence the condition of the lubricant.

Other objects and advantages of the invention will become apparent from the following specification, reference being had to the accompanying drawings in which:

Figure 1 is a side elevation of a preferred form of the invention; Fig. 2 is a section on line 2—2 in Fig. 1; Fig. 3 is a section on line 3—3 in Fig. 1; Fig. 4 is a central vertical sectional view of a modified form of the invention; Fig. 5 is a detail view of the front face of an indicating part as used in the modification shown in Fig. 4; Fig. 6 is a front view of another modification; and Fig. 7 is a central sectional view of the device shown in Fig. 6.

Referring to the drawing, and particularly to Figs. 1, 2, and 3 thereof, one form of the invention includes a transparent cylinder 10 held between end members 11 and 12, with the meeting surfaces protected against leakage by gaskets 13 and 14. Disposed within the transparent cylinder 10 is a spool 15 which is preferably formed from a single piece of highly reflective metal such as aluminum to which a polish may be given if desired.

Spool 15 has threaded extensions 16 and 17 at each end which pass through central openings in the end members 11 and 12 to engage nuts 18 and 19, tightening of which against the end members serves as a convenient means of holding the parts in assembled relation.

Nuts 18 and 19 are threaded on the exterior and interior respectively so that the device may be inserted in an oil line of an automotive engine wherever a coupling occurs in such line. For example, the common practice is to provide an interiorly threaded connection for an oil filter as an intake conduit and to connect a somewhat flexible intake pipe to the filter. By removing this connection and screwing the device of the present invention into the filter by threaded nut 18, the oil line connection can then be made by screwing into nut 19. The installation is thus very simple and can be made by any service station attendant.

The interior of nuts 18 and 19 are open and present a continuous passage for oil flowing to the filter. Spool extension 16 and 17 are bored axially as at 20, 21 and the passages thus formed connect with radial passages 22, 23 by which oil is forced to pass around the exterior of the spool 15 in flowing from one end to the other of the indicator. If desired, a check valve 24 may be inserted in the passage to the oil filter to prevent flow of oil back from the filter to the pump. This feature forms no part of the present invention, however.

The surface of spool 15 is formed as a series of spaced, concentric cylindrical surfaces of different diameters. The diameter of each of the cylinders thus formed is chosen empirically and is based on the average opacity or translucence of average oil when clean and when in various stages of deterioration, coupled with the reflection coefficient of the metal from which the several cylindrical surfaces are formed. It will be seen that for each cylinder an oil film or body of a predetermined thickness stands between the source of light and the reflecting surface. Thus for an oil that has become very dirty in use and is therefore relatively of low translucence, it will be possible for the operator to see only the largest of the cylinders. For an oil that is in average or good condition, the largest and next largest cylinders may be seen. Through clean oil, or oil that is in excellent running condition, the operator can see three of the cylinders, and when the oil is clear, before use, all four of the cylinders are visible. It will be apparent that further subdivision of the spool may be made, but for practical purposes it appears unnecessary.

In the modification of the invention shown in Figs. 4 and 5, the body of the device is designated 40 and the condition gauge 41. The latter is seated in the body and has a central oil passage 42 in communication with a passage 43 in the body to which the connection from the vehicle oil pump is established. An outlet passage 44 is also provided for oil passing from the indicator to the oil filter or back to the engine, in case an oil filter is not used. The upper part of the body 40 is provided with a threaded extension 45 which forms, on its interior, a recess for the reception of a cover glass 46 having a flange 47 seated in the body and held in place by an annular nut or bezel 48. The cover glass 46 provides, in cooperation with the body 40, a chamber 50 which is filled with oil, the condition of which is to be judged.

The reflecting element in this modification comprises a series of super-imposed concentric cylinders of increasing diameter as the depth of the oil film is increased, viewing the body from the top. It will be apparent that if the translucence of the oil is such that only the top surface of the top cylinder is visible the oil may be classified as dirty. If the translucence of the lubricant is such that the plane surfaces of the top two cylinders are visible the oil is in fair working condition while the ability to see three of the concentric cylindrical surfaces represents an oil condition classified as clean. If desired, suitable indicia may be placed on the cylindrical surfaces as indicated in Fig. 5.

In the modifications so far described the reflecting element has comprised cylindrical surfaces to be viewed either from the side or from above. An additional modification is shown in Figs. 6 and 7 and may comprise a series of stepped surfaces lying behind a body of oil so that light passing to and from each reflecting surface passes through a different predetermined volume of oil. In this modification the body of the indicator is designated 60, the inlet passage 61, and the outlet passage 62. A glass disc 63 is provided which is seated in the body, the front of which is open in the form of a circular window. The rear of the body is closed by a metallic reflecting member 64 which may be threaded into or otherwise fixed in the body and which cooperates with window 63 to form an oil chamber 65. The reflecting member 64 is provided with stepped plane surfaces 66, 67, 68, and 69 at progressively increasing distances from the window 63 so that light passing through the window and reflecting from the several plane surfaces must pass through an increasing volume of oil. It will thus be seen that if the oil is substantially opaque as it is when a high concentration of contaminants is present only the plane surfaces 66 will be visible. If the oil is progressively free from contaminating matter two, three, or even four of the plane surfaces will be visible simultaneously thus indicating that the oil is in condition for use. As in the other modifications, grading words may be placed on the plane surfaces to indicate the condition of the oil should the words be visible from outside the window 63.

While the invention has been described in connection with three preferred modifications and assemblages, it should be expressly understood that various other changes in the form and disposition of the parts may be made without departing from the invention as defined in the appended claim.

What I claim is:

An oil condition indicator comprising a transparent cylindrical cylinder, metallic end members closing said cylinder, a spool disposed within said cylinder and having projections extending beyond said end members, means engaging said projections and said end members to hold the parts in assembled relation, an oil passage entering each end of said spool and thence extending into the interior of said transparent cylinder, said spool having a series of stepped concentric surfaces of progressively increasing diameter formed thereon whereby light entering said transparent cylinder and reflecting from said spool is caused to pass through different predetermined volumes of oil contained within said transparent cylinder.

THEODORE W. HALLERBERG.

REFERENCES CITED

The following references are of record in the file of this patent:

UNITED STATES PATENTS

| Number | Name | Date |
| --- | --- | --- |
| 171,838 | Munnich | Jan. 4, 1876 |
| 294,052 | Leeds | Feb. 26, 1884 |
| 1,545,403 | Crouse | July 7, 1925 |
| 2,224,123 | Wilson | Dec. 3, 1940 |